UNITED STATES PATENT OFFICE.

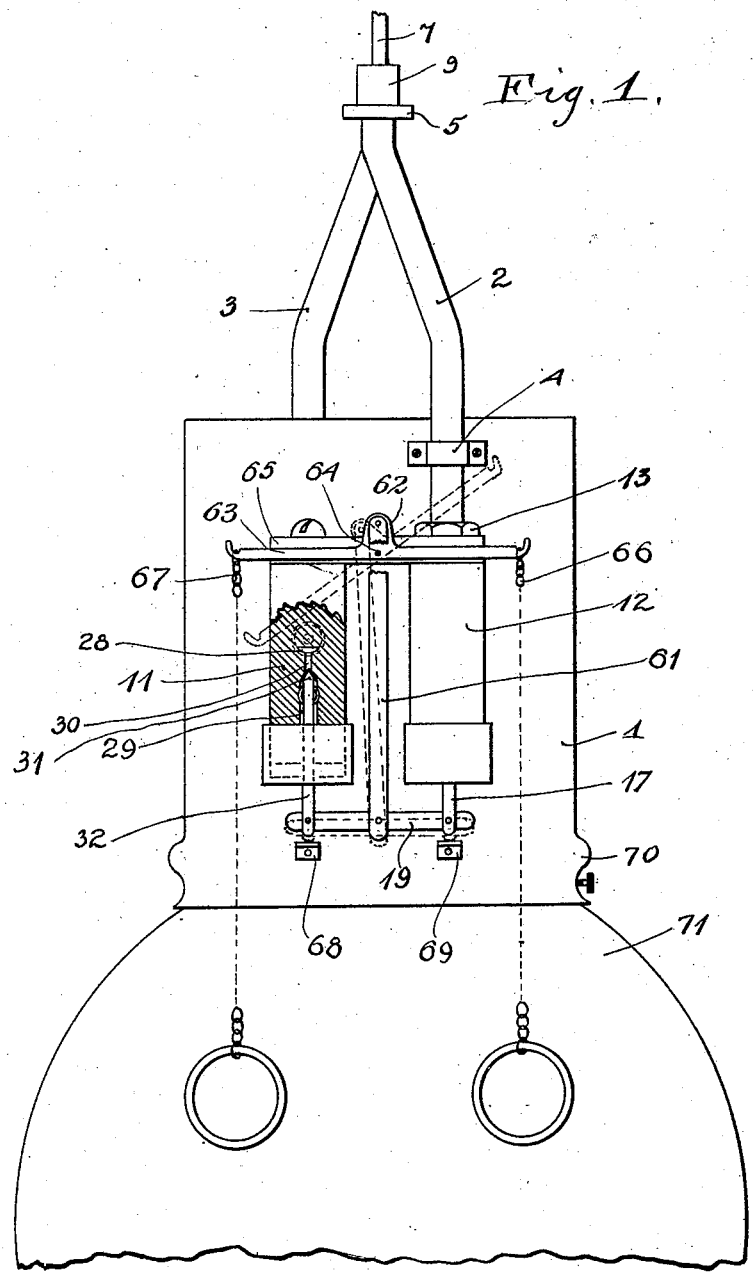

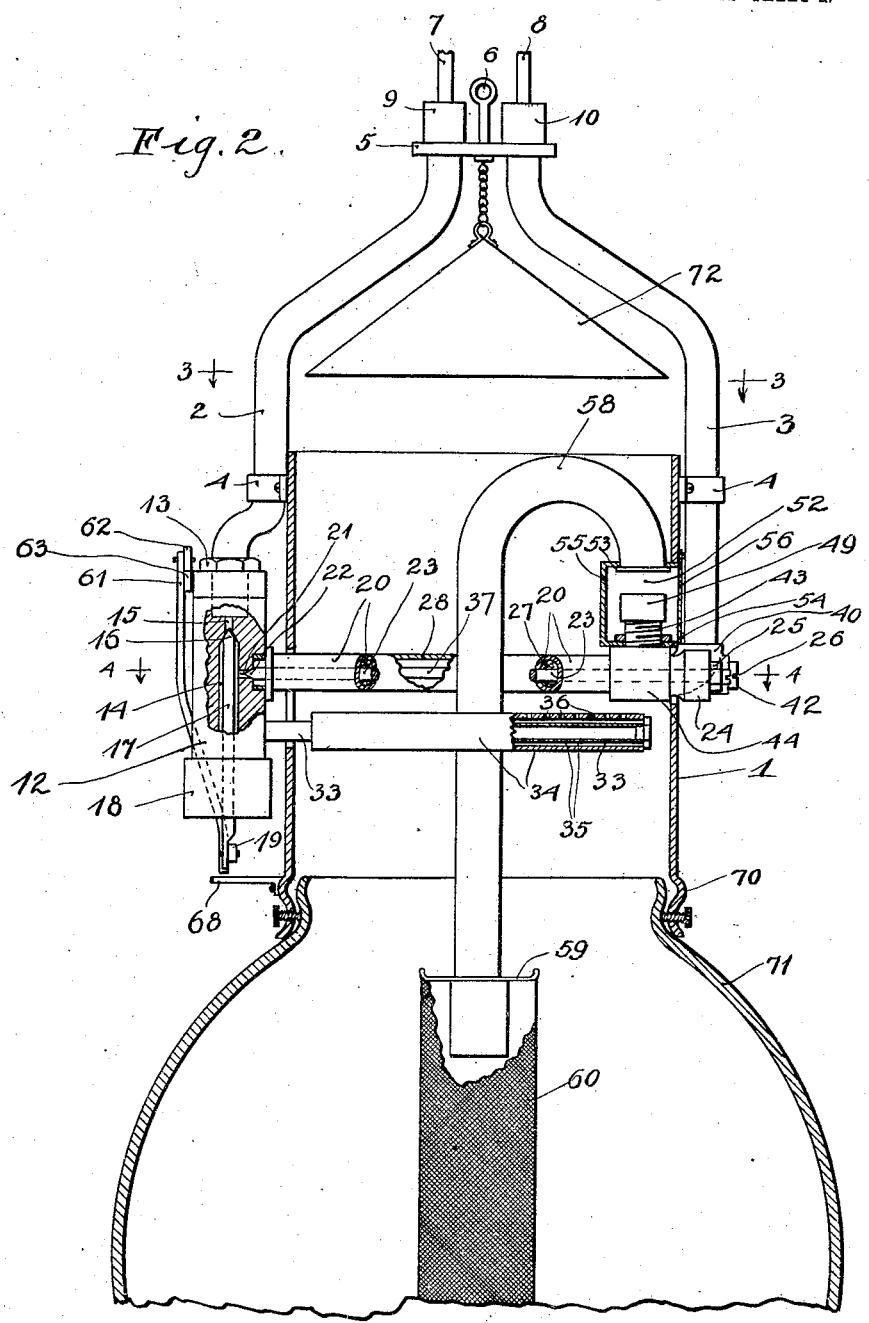

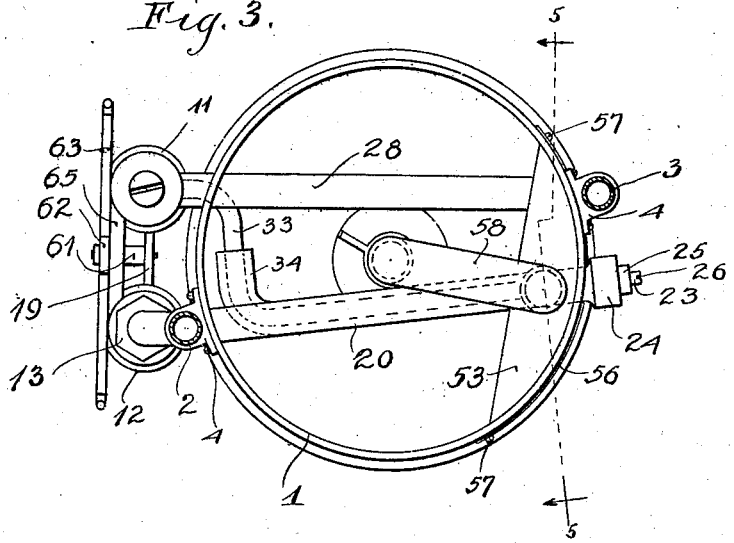
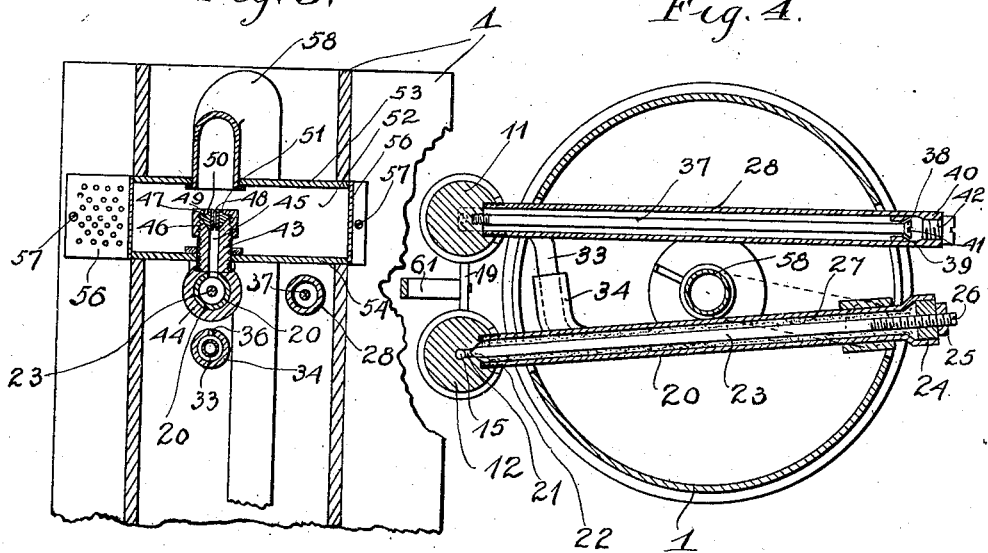

JOHN K. NORSTROM, OF CHICAGO, ILLINOIS, ASSIGNOR OF ONE-THIRD TO ELZA A. WILKINSON AND ONE-THIRD TO DANIEL D. HEALY, OF CHICAGO, ILLINOIS.

GASOLENE-LAMP.

No. 915,692.  Specification of Letters Patent.  Patented March 16, 1909.

Application filed December 23, 1907. Serial No. 407,752.

*To all whom it may concern:*

Be it known that I, JOHN K. NORSTROM, citizen of the United States, residing at Chicago, in the county of Cook and State of Illinois, have invented a certain new and useful Improvement in Gasolene-Lamps, of which the following is a full, clear, concise, and exact description, reference being had to the accompanying drawings, forming a part of this specification.

My invention relates to gasolene lamps, and involves several features of construction and arrangement which greatly increase the efficiency thereof, and which enable the lamp to be more readily lighted and controlled.

In accordance with my invention, I utilize the gas present in the pressure tank for heating the generator tube. The tank is only partly filled with gasolene, and the air pumped into the tank for raising the pressure is caused to pass through the gasolene to become enriched. This enriched air or gas is carried by an additional pipe to the lamps, while the gasolene is carried as heretofore through another pipe. At the lamp the lighting gas pipe connects directly with a burner arranged near the generator tube, with which the oil pipe connects. Valve mechanism is used for controlling the flow from both pipes, and the gas valve is first turned on and the burner lighted, and when the generator has been sufficiently heated the oil valve is turned on and the gas valve closed, the oil through the sufficiently heated generator being gasified before reaching the mantle. After the mantle is burning, its heat will be sufficient to maintain gasification within the generator. My invention goes farther and provides automatic means for controlling the valves and this means can be of a thermal nature along the principle of thermostats. The operation is such that a chain can be pulled to open both gas and oil main valves, whereupon gas may flow directly to the burner and there be lighted. The thermostatic valve within the generator is adjusted to become active when the generator has been sufficiently heated to gasify the oil, and will automatically connect the oil pipe with the generator. The gas then passing to the mantle will become ignited, the heat of the burner being sufficient to accomplish this. A second thermostatic valve is now affected by the heat of the mantle and becomes effective to close the connection between the burner and gas supply. When it is desired to extinguish the lamp, another chain is pulled to close both main valves, and the supply of oil and gas being directly shut off, the lamp will become extinguished. Thus the gasolene lamp can be lighted and extinguished as readily as an ordinary gas jet.

My invention will be fully understood when described in connection with the accompanying drawings, in which—

Figure 1 is a side elevation of the lamp; Fig. 2 shows a side view taken from the right of Fig. 1; the inclosing casing being in section and parts being broken away; Fig. 3 is a top view from plane 3—3 of Fig. 2; Fig. 4 is a sectional view taken on line 4—4 of Fig. 2, and Fig. 5 is a sectional view taken on line 5—5 of Fig. 3.

I have shown a cylindrical shell or supporting frame 1 of sheet material. An oil pipe 2 and a gas pipe 3 are secured to the frame at opposite sides thereof as by means of bands 4. These pipes deflect toward each other and are secured together at their upper end by a plate 5 through which extends an eye 6, by means of which the lamp may be hung. The pipes connect with the supply hollow wires or pipes 7 and 8 through couplings 9 and 10. At the left of the frame are the main valve mechanisms 11 and 12, the oil pipe 2 threading directly into the top of the valve frame 12 and being locked therein by locking nut 13. This pipe is adapted for connection with valve chamber 14 through duct 15, a needle valve 16 normally closing this duct, the needle valve stem 17 passing downwardly through stuffing box of cap 18 to be pivoted to one end of a cross lever 19. Extending from and secured at one end of the valve frame 12 is the tube 20 forming the gas generator and this tube is adapted for connection with valve chamber 14 through duct 21. This duct, however, is normally closed by the needle valve 22 whose stem 23 passes longitudinally through the tube 20, threading at its other end in and through the head 24 of the generator tube, being at the outside engaged by a locking nut 25 and provided at its end with a slot 26, whereby it may be turned by a screw driver. The generating chamber between the tube and rod is filled with asbestos or other non-inflammable material 27. The tube should be of a material having a higher co-efficient of expansion than the rod 23, so that when these members are heated the tube will expand faster than the rod and will move the needle valve 22 to open the duct 21 to connect the generator chamber with the valve chamber 14. By turning the rod at 26, the operation of the automatic valve can be adjusted.

The gas pipe 3 connects with one end of the horizontal pipe or tube 28, whose other end passes into main valve frame 11, being there adapted for connection with the valve chamber 29 through the duct or port 30. This duct is normally closed by needle valve 31, whose stem 32 extends downwardly through the valve frame to be pivoted at its lower end to the other end of the cross lever 19. Secured to and leading from the valve chamber 29 is the horizontal pipe 33, which passes longitudinally through the burner tube 34 arranged horizontally directly below the generator tube 20. The pipe 33 within the tube has the gas outlet openings 35 along a lower line, while the tube has the gas outlet openings 36 along an upper line. The purpose of this arrangement is to cause the gas to be more evenly distributed through the outlets 36. The tube 34 could, of course, be directly connected with the valve chamber 29, but the gas under pressure from the pressure tank would then rush out unevenly through the openings 36, and this arrangement of piping is therefore used to distribute the gas more evenly. This tube being directly below the entire length of the generator tube, the flame will surround the generator tube and in a very short time heat the tube to the gasifying temperature. Extending through the tube 28 is a rod 37, threading at its left end in the main valve frame 11. At its right end this rod has a valve head 38 for engaging the valve seat 39, from which it is normally disconnected. This valve seat is formed in the coupling 40, connecting the pipe 3 with the pipe 28. The head 38 has a slot 41 to be engaged by a screw driver, for instance, and a plug 42 can be removed from the coupling member 40 so that the screw driver can be inserted to engage with the slot 41 so that this automatic valve mechanism can be adjusted. The tube 28 is of a material having a greater co-efficient of expansion than the rod, and the adjustment is such that when these members are heated the tube will carry the seat 39 into closing engagement with the valve head 38, thus closing the connection with pipe 3 and tube 28.

In Fig. 5 the construction of the tip mechanism is shown. The tip support 43 extends upwardly from collar 44 encircling the generator pipe 20, and has the center passageway 45 connecting with the generator pipe. The upper end of the support 45 forms an annular beveled seat 46 on which rests the tip 47, which is preferably of some non corrosive material, such as platinum, and through the center of this tip leads the duct 48. The end of the support 46 is threaded and engaged by a cap 49, which has the opening 50 in its horizontal part for receiving the reduced part 51 of the tip, the top of the cap and the tip being in the same plane when the cap is in place. The tip extends into the mixing chamber 52, which is formed by a depression in the supporting frame 1, this chamber having the upper and lower walls 53 and 54 respectively, the rear wall 55 and the front inclosing wall or plate 56, which is perforated for the admission of air. The walls 53, 54 and 55 may be formed integral with the body part or may be a separate piece which is inserted and secured in a slot cut in the body part 1. The perforated plate 56 may be secured in any manner to the body part as by means of screws 57. Leading from this mixing chamber is the supply pipe 58 which takes a 180 degree upward curve and passes downwardly to supply gas to the consuming device or burner 59 with which an illuminating mantle 60 may be associated. The center of the end of the pipe 58 communicating with the mixing chamber is over the tip duct and the gasolene gas from the generator tube is blown upwardly through the tip duct into the mantle pipe, and sufficient air enters the mixing chamber and the pipe 58 and the gasolene gas and air become thoroughly mixed and commingled upon their passage through the pipe 58 and by the time they reach the mantle.

As best shown in Fig. 1, the cross lever 19 is pivoted to the lower end of a main link 61 which at its upper end is pivoted to the projection 62 from the chain lever 63 pivoted at 64 to the bar 65 connecting the tops of the main valve members 11 and 12. Chains 66 and 67 hang from the ends of the chain lever.

The operation of the lamp is now apparent. In the normal position as best shown in Fig. 1, lever 63 is in horizontal position and the pivot point between link 61 and extension 62 is at its highest point, and the main valves 16 and 31 are closed. Automatic oil valve 22 is also closed, and the automatic gas valve 38 is open. There can therefore be no flow from the pipes 2 and 3 to the generator tube and burner, respectively. If it is desired to start the lamp, chain 67 is pulled to carry the lever 63 and link 61 to the position shown in dotted lines shown in Fig. 1, the link 61 being depressed to move the cross lever 19 downwardly and to carry valves 16 and 31 from their seats to thus open the main valves. To insure opening of both valves and to prevent opening of only one valve, stops 68 and 69 are provided, which extend from the supporting frame below the ends of valve rods 17 and 32, respectively. On account of these stops the link 61 cannot be moved downwardly without causing both valves to unseat. The oil valve chamber 14 is now connected with the oil supply, and starting gas from pipe 3 can flow through automatic valve 38, through valve 31 into valve chamber 29, through pipe 33 and into tube 34, where it can be lighted with a match. The flame from the burner encircles the generator tube 20, and the adjustment being properly set the tube 20 will expand away from the rod 23 to open automatic valve 22 when the generator has been heated to a proper gasifying temperature, the oil from the valve chamber 14 finds its way into the generator tube, and on account of the heat therein is immediately gasified, the gas passing upwardly through the passageway 45 and through the tip duct 48 into the mixing chamber and with a proper proportion of air passes into and down the mantle pipe 58, where some of the illuminating gas will arise to be ignited by the burner and the flame communicated to the mantle, which will then burn in the ordinary manner. The heat from the mantle quickly heats the tube 28, which on account of the different co-efficiencies of expansion of said tube and the rod 37 will automatically close the valve controlling the connection between the gas pipe 3 and the tube 28, and the supply of starting gas is automatically shut off from the burner, which becomes extinguished. As soon as the gas becomes ignited at the mantle, the heat traveling upwardly about both the generator tube and the automatic valve tube 28 will be sufficient to maintain the expansion of these tubes to hold the valves in the proper position. To extinguish the lamp it is necessary only to pull on chain 66 to raise link 61 to its normal position, thereby raising valve stems 17 and 32 to re-seat their valves 16 and 31 to entirely shut off from the lamp the gas and fuel supply, the lamp then, of course, becoming extinguished. Thus the lamp of my invention may be lighted as readily as an ordinary gas lamp controlled by chains, and once being started it controls itself entirely automatically until gas is supplied to the mantle and the same illuminated, when the starting gas supply is automatically shut off. The stream of gas from the tip and through the mixing chamber will not be disturbed by air currents past the lamp. The perforated cap plate 56 will prevent these currents from sweeping through the mixing chamber to disturb the passage of the proper proportion of gas and air into the mantle pipe. If it is desired to clean the tip, this can readily be accomplished by inserting the proper cleaning tool into the mixing chamber and into the tip duct. The tip can be readily removed for cleaning or repair by unscrewing the cap 49, and all this can be done without disassembling or disconnecting any of the other parts of the lamp. The automatic valves as has already been shown, are readily adjustable from the outside of the frame and can be very readily removed for cleaning purposes or for repairing, such as re-grinding.

The lamp frame may, of course, be provided with a globe or shade holder part 70 for supporting a globe or shade 71, and a smoke cap 72 may also be suitably suspended over the upper end of the lamp, as shown.

Having thus described my invention, I desire to secure the following claims by Letters Patent:

1. In a gas lamp, the combination of a generator, valve mechanism controlling the connection of said generator with a source of oil supply, a burner for heating said generator, a second valve mechanism for controlling the connection of said burner with a source of fuel supply, automatic means for actuating the first valve mechanism to connect the generator with the source of oil supply when said generator has been heated to a gasifying temperature whereby oil may flow into the generator to become gasified therein, an illuminating member connected with the generator for receiving the generated gas, and means controlled by the heat from the illuminating member for automatically actuating the second valve mechanism to disconnect the burner from the source of fuel supply.

2. In a gas lamp, the combination of a generator, valve mechanism for controlling the connection of said generator with a source of oil supply, a burner arranged to heat the generator, a second valve mechanism for controlling the connection of said burner with a source of fuel supply, thermostatic mechanism actuated to open the first valve mechanism when said generator has been heated to a gasifying temperature whereby oil may enter the generator to be gasified, an illuminating member connected with the generator for receiving and for burning the generated gas, and thermal means controlled by the heat from the illuminating member for automatically closing the second valve mechanism to disconnect the burner from the source of fuel.

3. In a gas lamp, the combination of a generator tube, main valve mechanism primarily controlling the connection of said generator tube with a source of oil supply, a burner arranged to heat the generator tube, a second main valve mechanism primarily controlling the connection of said burner with a source of fuel supply, thermostatic valve mechanism heated by the burner to be actuated to connect the generator tube with the source of oil when said tube has become heated to a gasifying temperature whereupon oil may flow into said tube to become gasified, an illuminating member connected with the generator to receive and to burn the generated gas, additional thermostatic valve mechanism actuated after the illuminating member generates heat to automatically disconnect the burner from the source of fuel supply.

4. In a gas lamp, the combination of a generator, a manual valve for controlling the flow of oil from a source to the generator, thermostatic valve mechanism normally disposed to prevent the flow of oil into said generator, a burner arranged to heat the generator, a manual valve for primarily connecting said burner with a source of fuel, said thermostatic valve mechanism being affected by the heat from the burner to allow oil to flow into the generator after said generator has been heated to a gasifying temperature, the in-flowing oil being gasified within the generator, a member connected with the generator for receiving and burning the generated gas, and additional thermostatic valve mechanism controlled by the heat from said member for automatically disconnecting said burner from the source of fuel supply.

5. In a gas lamp, the combination of a supporting frame, two pipes leading therefrom for connection respectively with a source of oil supply and a source of gas supply, a generator member, a burner near said generator member, manual main valve mechanism normally disposed to disconnect the generator and burner from the oil and gas supplies respectively, actuation of said manual valve mechanism causing connection of the oil supply with the generator and connection of the gas supply with the burner, whereby said burner may be lighted to heat the generator, means automatically controlled by the heat of the burner for finally connecting the oil supply with the generator when said generator has become heated to a gasifying temperature whereupon oil may flow into said generator to become gasified, an illuminating member connected with the generator to receive the gas therefrom, and additional means automatically controlled by the heat from the illuminating member for disconnecting the burner from the gas supply.

6. In a gas lamp, the combination of a generator, a normally closed valve for controlling the connection of said generator with a source of oil supply, means for primarily heating the generator, a valve for connecting said primary heating means with a source of gas supply, thermostatic means affected by the heat from the primary heating means to open the first mentioned valve to admit oil into the generator, an illuminating member connected with the generator for receiving gas therefrom, and means for automatically shutting off the gas supply to the primary heating means after the illuminating member has been ignited.

7. In a gas lamp, the combination of a generator, a thermostatic valve for controlling the connection of said generator with a source of oil supply, a burner for primarily heating the generator to a gasifying temperature, the heat from the burner causing actuation of the thermostatic valve to allow oil to flow into the generator to become gasified, a member for receiving and burning the generated gas, a thermostatic valve for controlling the connection of the burner with a source of gas supply, the said last mentioned thermostatic valve being caused by the heat from said member to shut off the gas from the burner, the heat from said member also causing the first mentioned thermostatic valve to remain in open position after extinction of the burner.

8. In a gas lamp of the class described, the combination of a generator in the form of a horizontal tube, a valve at one end of said tube for controlling the connection of said generator with a source of oil supply, a tip extending upwardly from the other end of the generator, a mixing chamber in which said tip is disposed, a burner for primarily heating the generator to gasifying temperature, an out-flow pipe leading upwardly from the mixing chamber and then downwardly, a consuming device connected to the lower end of the outflow pipe, and means for automatically causing the burner to become extinguished when the consuming member is ignited to generate heat, the heat generated by the consuming device serving to maintain the gasifying temperature of the generator after the burner is extinguished.

9. In a gas lamp of the class described, the combination of a generator in the form of a horizontal tube, a valve controlling the in-flow of fuel at one end of the generator, a tip extending upwardly from the other end of the generator, a mixing chamber into which the tip extends, a feed pipe extending upwardly from the mixing chamber and then downwardly, a gas consuming device connected with the end of the feed pipe and disposed below the generator, thermostatic means associated with the generator valve, a burner extending below the generator, a valve for controlling the connection of the burner with a source of gas, the heat from said burner serving to primarily heat the generator to gasifying temperature and to cause actuation of the thermostatic means to open the inlet valve to allow oil to flow into the generator to become gasified and to be fed to the consuming device, the flame of the burner serving to cause ignition of the gas fed to the consuming device, the heat from the consuming device serving to maintain the generator at gasifying temperature after the burner is extinguished.

10. In a gas lamp of the class described, the combination of a generator, an oil chamber, a main valve for controlling the connection of said oil chamber with a source of oil supply, a thermostatically controlled valve for controlling the connection of the oil chamber with the generator, a burner, a main valve for controlling the flow of gas to the burner, a thermostatically controlled valve for automatically controlling the flow of gas into the burner, said automatic valve for the generator being normally closed and the automatic valve for the burner being normally open, means for simultaneously opening both the main valves whereby the burner may be ignited, the heat from the burner serving to primarily heat the generator to gasifying temperature to cause actuation of the thermostatic valve to allow oil to flow from the oil chamber into the generator to become gasified, a consuming device connected with the generator to receive the generated gas therefrom, the flame from the burner serving to ignite the consuming device, the heat from the consuming device causing operation of the thermostatic valve for the burner to shut off the flow of gas from the burner, the heat from the consuming device then serving to maintain the generator at gasifying temperature.

11. In a gas lamp of the class described, the combination of a generator, a consuming device connected with the generator, a main valve for controlling the flow of oil to the generator, a second valve for controlling the rate of flow of oil to the generator, said second valve being normally closed, a burner for heating the generator, a main valve for controlling the flow of gas to the burner, means for simultaneously opening both main valves whereby the burner may be ignited to heat the generator, and means whereby the heat of the burner will automatically cause opening of the second valve.

12. In a gas lamp of the class described, the combination of a generator, a consuming device connected with the generator, a main valve for controlling the flow of oil to the generator, a second valve for automatically controlling the rate of flow of oil to the generator, said second valve being normally closed, a burner for heating the generator, a main valve for controlling the flow of gas to the burner, means for simultaneously opening both main valves whereby the burner may be ignited to heat the generator, a second valve for controlling the flow of gas to the burner, and means controlled by the heat from the consuming device whereby the second valve for the burner is operated to shut off the gas of the burner, the heat from the consuming device then serving to maintain the generator at gasifying temperature.

In witness whereof, I hereunto subscribe my name this 18th day of December A. D., 1907.

JOHN K. NORSTROM.

Witnesses:
 CHARLES J. SCHMIDT,
 FRED W. KOEHN.